United States Patent
DeWitt et al.

(10) Patent No.: US 7,508,175 B2
(45) Date of Patent: Mar. 24, 2009

(54) SYSTEM AND METHOD FOR REDUCING BODY DIODE CONDUCTION

(75) Inventors: Dwight B. DeWitt, St. Charles, MO (US); Cameron D. Brown, St. Charles, MO (US); Steven M. Robertson, Imperial, MO (US)

(73) Assignee: The Boeing Company, Chicago, IL (US)

( * ) Notice: Subject to any disclaimer, the term of this patent is extended or adjusted under 35 U.S.C. 154(b) by 289 days.

(21) Appl. No.: 11/533,914

(22) Filed: Sep. 21, 2006

(65) Prior Publication Data

US 2008/0074093 A1    Mar. 27, 2008

(51) Int. Cl.
G05F 1/618 (2006.01)
G05F 1/56 (2006.01)
(52) U.S. Cl. .................. 323/224; 323/225; 323/282
(58) Field of Classification Search ............ 323/222, 323/223, 225, 268, 271, 282, 284, 350, 351
See application file for complete search history.

(56) References Cited

U.S. PATENT DOCUMENTS

| 4,161,023 | A * | 7/1979 | Goffeau ............... 363/124 |
| 6,636,431 | B2 * | 10/2003 | Seki et al. ............. 363/65 |
| 6,693,412 | B2 * | 2/2004 | Ruan et al. ............ 323/282 |
| 6,707,281 | B2 * | 3/2004 | Solivan ............... 323/225 |
| 6,861,826 | B2 * | 3/2005 | Lynch ................. 323/224 |
| 6,989,997 | B2 * | 1/2006 | Xu et al. .............. 363/16 |
| 7,239,114 | B2 * | 7/2007 | Durbaum et al. ....... 323/224 |

OTHER PUBLICATIONS

Edelmoser et al.; "EMI-Reduced, Efficiency Optimized Solar Inverter Power Stage"; Proceedings of the Sixth IASTED International Conference; European Power and Energy Systems; Jun. 26-28, 2006: pp. 395-399; Rhodes, Greece.

* cited by examiner

Primary Examiner—Gary L Laxton
(74) Attorney, Agent, or Firm—Klein, O'Neill & Singh, LLP

(57) ABSTRACT

A circuit for minimizing the effect of a parasitic body diode by combining a power electronics switching circuit with a pinch-off switch and a delay function.

11 Claims, 5 Drawing Sheets

SYSTEM AND METHOD FOR REDUCING BODY DIODE CONDUCTION

BACKGROUND

1. Field of the Invention

The present invention relates to power electronic switching circuits and in particular to voltage converters employing two or more controlled switches.

2. Related Art

Switching circuits operating at high switching speeds and/or slew rates and at high currents are subject to performance degradation caused by parasitic devices, such as the inherent body diode of an active switch. This diode can conduct current even if another current path is available, such as a parallel-connected free-wheeling diode. When a MOSFET switch acting as a synchronous rectifier turns off, the current can transfer from the MOSFET channel into the parasitic body diode. When the control MOSFET turns on the recovery charge stored in the body diode during conduction is swept out. Abrupt reverse recovery of the body diode can cause higher switching losses and high frequency ringing, which places higher stresses on components and can couple to the output and cause noise and Electromagnetic Interference (EMI) associated problems.

Various techniques are available to reduce the effects of body diode conduction. One common method is to add a Schottky diode in parallel with the synchronous rectifier MOSFET and allow enough dead time for the current to transition from the body diode into the Schottky diode. Adaptive and/or predictive gate-drive techniques sense the voltage across the synchronous rectifier MOSFET and adjust the timing delays in order to reduce the time that the body diode conducts, thereby achieving lower losses. Some semiconductor manufacturers make MOSFETs with a tightly integrated Schottky diode in the same package. The tight integration provides a low inductance path with a lower forward voltage drop, which allows the current to transfer directly from the channel to the Schottky diode. Another method exists that employs a magnetic element to produce a current that maintains the body diode in a reverse-biased state.

Unfortunately, many of these methods for reducing body diode conduction and the issues associated with reverse recovery have limitations in their use and applicability. For example, a MOSFET with a tightly integrated Schottky diode may not be available with the desired characteristics (for example, Vds, Rds-On, Qg, package type). If high frequency operation is required, increasing the dead time may not be acceptable. Predictive or adaptive gate-drive may limit the choice of control methods, for example, the designer may need to buy a controller IC from a specific manufacturer or design his or her own digital controller. In addition, a predictive or an adaptive gate-drive may not provide adequate protection against shoot-through or prevent the body diode from conducting. Adding a magnetic element to keep the body diode reverse-biased may increase the complexity to an undesired level.

Accordingly, there is a need to provide a converter power module that effectively controls and minimizes the effect of the body diode. Specifically, there is a need to provide a means to reduce the adverse effects of EMI and power loss due to the parasitic body diode.

SUMMARY

The invention minimizes the effect of parasitic body diodes by combining a power electronics switching circuit with a switch and a delay function. These circuit enhancements prevent significant current flow through the internal body diode of other switches in the circuit, which ensures minimal body diode reverse recovery effects on every switching cycle. The switching circuit is made more robust because of the reduced power loss, which in turn allows for the use of smaller components, smaller filters, less heat sinking, less input power, and potentially lower total costs.

In one aspect of the invention, a circuit is provided for minimizing or eliminating the adverse effects of a body diode. The circuit includes a first switch coupled between a power source and a load, the first switch when "on" allowing current from the power source to the load. The circuit also includes a second switch coupled parallel with the load, the second switch when "on" providing current return for the load; and a third switch coupled serially to the second switch for preventing current flow through the body diode of the second switch.

The present invention also includes a free-wheeling diode coupled parallel across the second switch and the third switch for providing an alternative conduction path for the load current during a time when the first switch, the second switch and the third switch are off; a switch controller coupled to the first switch, the second switch and the third switch for controlling on/off time of the first switch, the second switch and the third switch; and a delay function coupled between the controller and the second switch for providing a sufficient timing margin.

In another aspect of the invention, a method is provided for reducing body diode conduction in a power electronics switching circuit. The method includes turning on a first switch at time t0; turning off the first switch at time t1 to allow a first diode to start conducting; turning on a third switch at time t2; turning on a second switch at time t3 while the first diode stops conducting; turning off the third switch at time t4 while the first diode starts conducting; turning off the second switch at time t5; and turning on the first switch at time t6, where the second and third switches are off and where the first diode stops conducting.

This brief summary has been provided so that the nature of the invention may be understood quickly. A more complete understanding of the invention may be obtained by reference to the following detailed description of embodiments thereof in connection with the attached drawings.

BRIEF DESCRIPTION OF THE DRAWINGS

The foregoing features and other features of the present invention will now be described with reference to the drawings. In the drawings, the same components have the same reference numerals. The illustrated embodiment is intended to illustrate, but not to limit the invention. The drawings include the following Figures.

DETAILED DESCRIPTION

The following definitions are provided as they are typically (but not exclusively) used in the power electronics switching circuit environment, implementing the various adaptive aspects of the present invention.

A body diode is a byproduct of the fabrication process of a semiconductor device, for example a MOSFET. It is an intrinsic "built-in" anti-parallel diode between the source and drain terminals of the MOSFET device.

A control switch is a switch in a switching converter that controls the amount of energy supplied by the source. In a buck converter, the control switch is coupled serially between the input and the load.

A synchronous rectifier switch is a switch in a switching converter that emulates diode behavior. In a buck converter, a synchronous rectifier is configured in parallel with the load.

Cross-conduction is a circuit condition that occurs when both the control switch and the synchronous rectifier switch are "on" simultaneously, effectively shorting the power supply.

Dead-time is a short delay between opening the synchronous rectifier switch and closing the opposing control switch, or between opening the control switch and closing the synchronous rectifier switch, to ensure that both switches are not conducting simultaneously.

A free-wheeling diode, such as a high-speed, low forward-voltage drop diode, is connected across a switch and provides an alternate conduction path through which the load current may flow during the dead-time.

Diode reverse recovery time is the time required for a diode that is conducting forward current to switch from forward conducting to reverse biased, non-conducting. Recovery is a phenomena associated with diodes. A diode requires a finite amount of time to transit from a status of conduction, to a status of non-conduction to be able to physically block current flow.

A pinch-off switch is a switch placed in series with a synchronous rectifier for the purpose of interrupting current in the synchronous rectifier.

MOSFET parameters used in the specification:
Rds(on)—Static drain-source on-state resistance;
Qg—Total gate charge; and
Vds—Drain-source voltage Although the circuit configurations illustrated in FIG. 1 and FIG. 2 and their associated descriptions, employ a synchronous rectifier, the invention is applicable to any switching circuit that can forward bias a body diode, including bridge circuits and motor drivers. The invention is also applicable to other power converter topologies, such as boost and buck-boost (flyback). In addition, the circuit timing may be adjusted to reduce unwanted body diode conduction at any time in a switching cycle when it occurs, not only at the time described in the figures.

Figure 1:
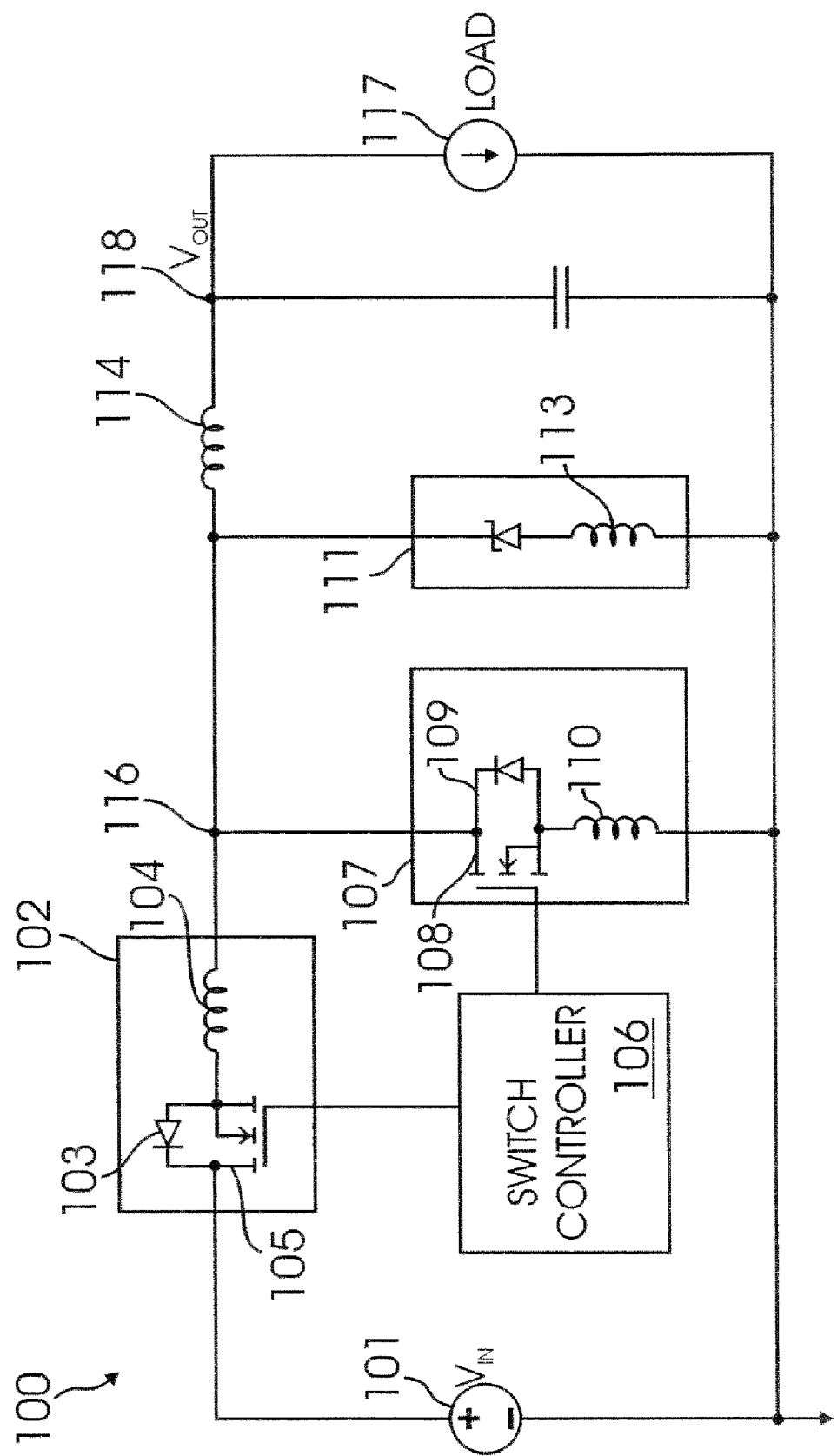
FIG. 1 shows an implementation of a switching circuit.

FIG. 1 shows an implementation of a switching circuit 100. The input power supply voltage ($V_{IN}$) is stepped down to the required operating voltage by controlling the duty cycle of the two power MOSFETs. In a typical 12 V power supply delivering power at an output voltage of 1.2 V, the duty cycle is approximately 10%, with the control MOSFET on for approximately 10% of the time and the synchronous rectifier MOSFET on for approximately 90% of the time during each period. At initial conditions, internal switch 105 is turned on (conducting), while internal switch 108 is turned off (not-conducting), the voltage at node 116 is $V_{In}$ (neglecting voltage drop across switch 102), free-wheeling diode 111 is reverse biased, and current is flowing in switch 102 through internal switch 105, first inductor 104, second inductor 114 and load 117.

When switch controller 106 turns off switch 102, the current in second inductor 114 transfers into diode 111. After switch controller 106 turns on switch 107, the current in diode 111 transfers into switch 107, which has a lower forward voltage drop than diode 111.

Next, when switch controller 106 turns off switch 107, due to the inductances of third inductor 110 and fourth inductor 113, the current in internal switch 108 initially transfers into parasitic or body diode 109. Because of the relatively high voltage drop across body diode 109, the current starts transferring into diode 111. However, at high operating frequencies and high currents, the dead-time between switch 107 turning off and switch 102 turning on does not last long enough to allow the transfer of all the current out of body diode 109 and into diode 111. When switch controller 106 turns on switch 102, diode 111 turns off allowing the voltage at node 116 to rise to $V_{In}$ 101 (neglecting voltage drop across switch 102).

If body diode 109 is not fully recovered when $V_{In}$ 101 is applied across switch 107, it causes a large spike of reverse recovery current through body diode 109. This reverse recovery current is sourced by $V_{In}$ 101 through switch 102. When body diode 109 eventually does recover, it snaps off rapidly. The large current change through the package inductances of first inductor 104 and third inductor 110 generates a large voltage spike on node 116.

Although the timing for internal switches 105 and 108 may be adjusted to minimize the likelihood of cross-conduction occurring, there may still be an excessive ringing at node 116 when switch 105 is turned on (due to the recovery of body diode 109), creating adverse EMI effects.

Figure 2:
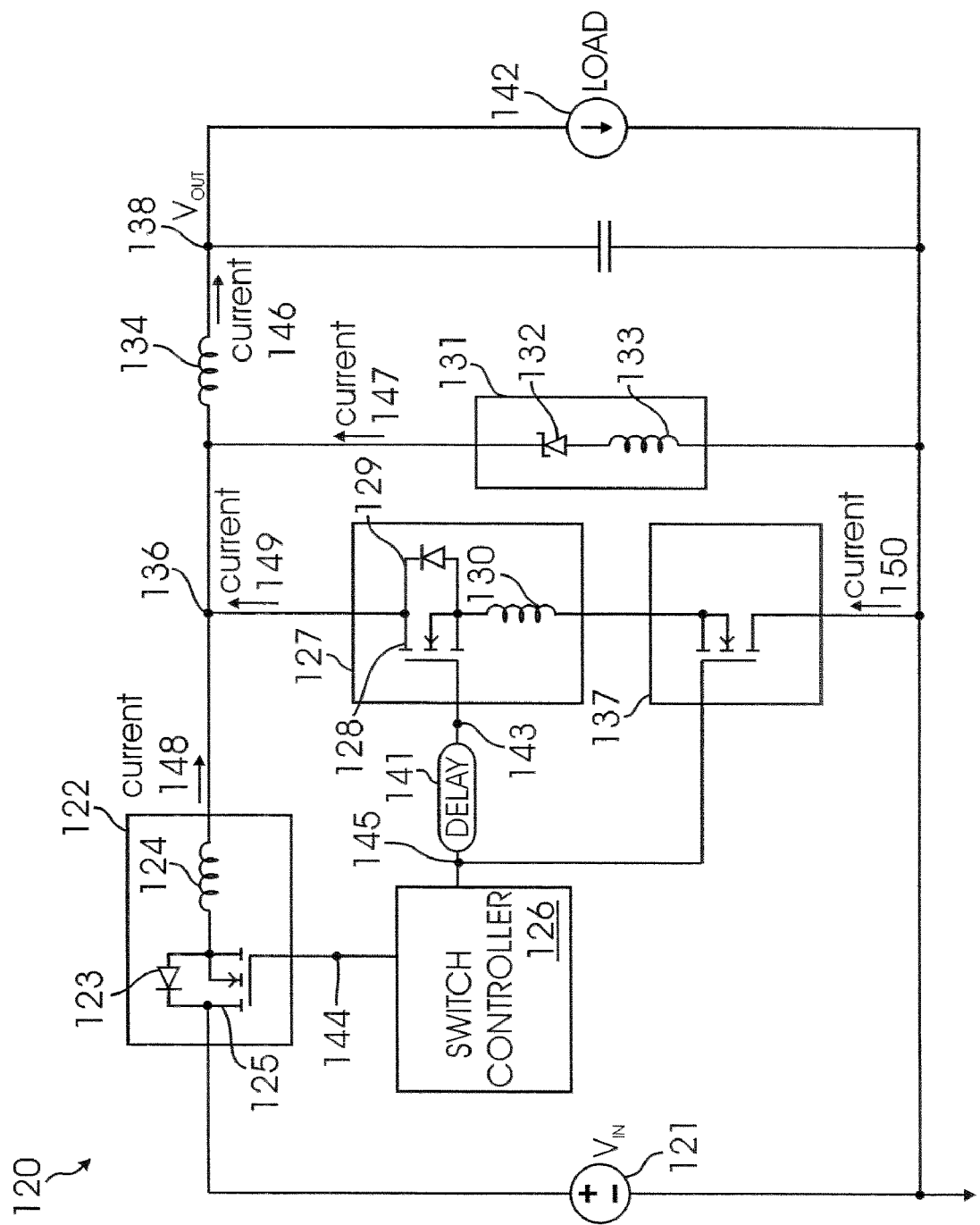
FIG. 2 shows an implementation of a switching circuit in accordance with an embodiment of the present invention.

FIG. 2 shows a circuit implementation in accordance with an embodiment of the present invention. As shown in FIG. 2, circuit 100 (FIG. 1) is combined with an pinch-off switch 137, and a delay 141 to create circuit 120. The time delay function may include a resistor-capacitor filter coupled to a switch driver input of switch controller 126. In another embodiment, the delay function may be a digital delay, for example, if a digital controller 126 were used.

Figure 3:
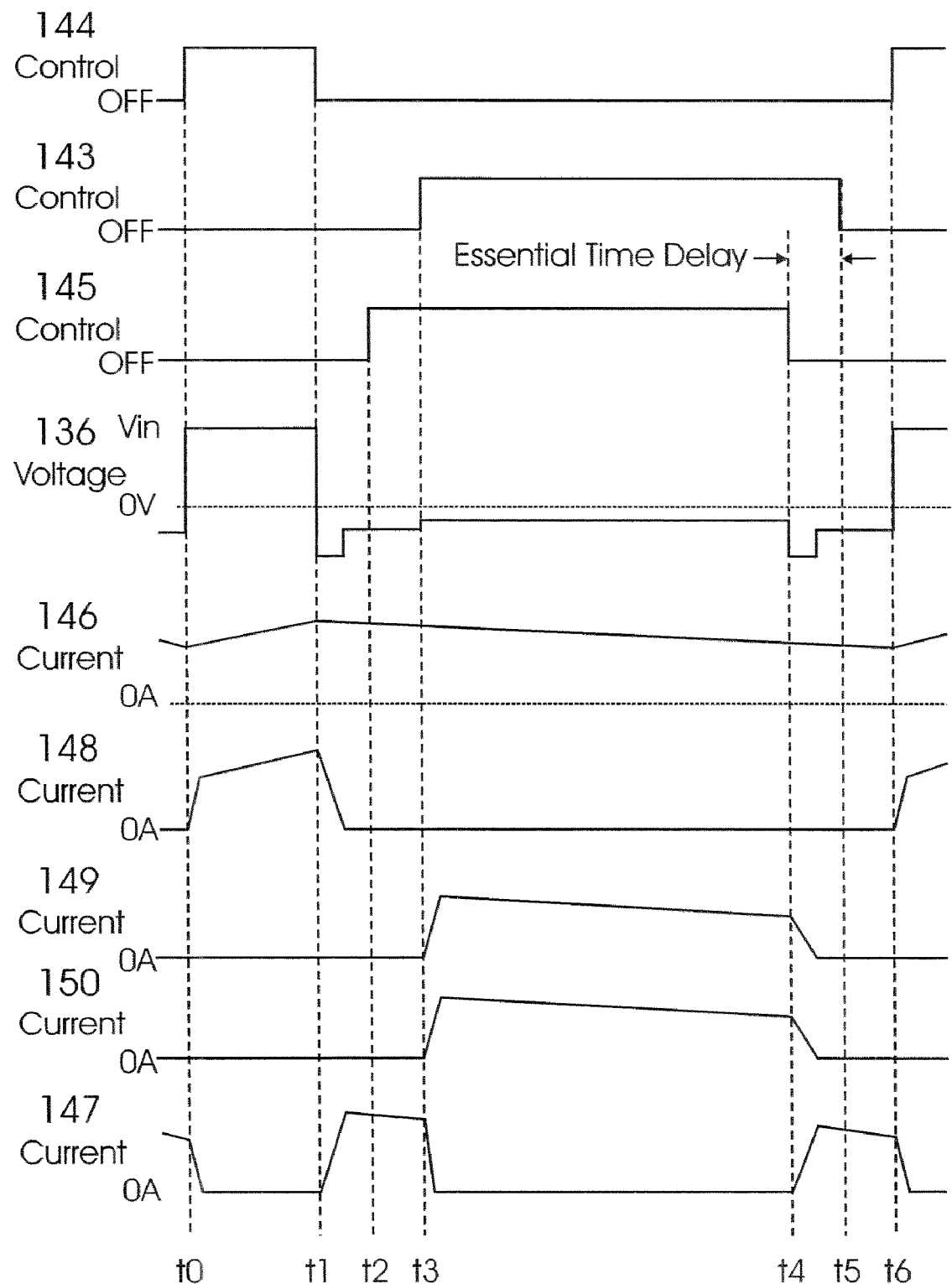
FIG. 3 is a timing diagram showing waveforms at various points of the switching circuit in accordance with an embodiment of the present invention.

The operation of circuit 120 is best understood from FIG. 2 together with the timing diagrams shown in FIG. 3.

In one operational embodiment, at time $t_0$ (FIG. 3), switch 122 is on while switch 127 and switch 137 are off. At this stage, the voltage at node 136 is at $V_{In}$ 121 (neglecting voltage drop across switch 122), free-wheeling diode 131 is reverse biased, and current is flowing in switch 122, output inductor 134, and load 142.

At time $t_1$, switch controller 126 turns off switch 122, and the current in output inductor 134 flows through diode 132.

At time $t_2$, switch controller 126 turns on switch 137, and after a time delay introduced by delay 141, switch 127 turns on at time $t_3$. Under this condition, the current in diode 131 transfers to switch 137 and switch 127, which have a lower forward voltage drop than diode 131. In one embodiment, switch 127 may have a lower breakdown voltage than switch 122. In one alternative embodiment, circuit 120 does not require a time delay for switch 127 turn-on (time interval $t_3-t_2$ can be equal to 0), although the time delay may be present.

At time $t_4$, switch controller 126 turns off switch 137, which pinches off the current in switch 127. The current in output inductor 134 pulls down the voltage at node 136, which forward biases diode 131.

After time delay 141, at time $t_5$, switch 127 is turned off. At the moment when switch 127 turns off as a result of the delay function, the current in internal switch 128 has decayed to zero or nearly to zero, so body diode 129 does not become forward biased.

At time $t_6$, switch controller 126 turns on switch 122, raising the voltage at node 136 to $V_{In}$ 121. Diode 131 stops conducting. Because body diode 129 has not been conducting current, it does not have stored charge and thus does not generate a reverse recovery current spike. Without a reverse recovery current spike, there is no substantial current in package inductances 124 and 130 to cause a voltage spike on node 136.

The switches described above are not intended to be limited to any specific type of switch, and may be, for example, N channel MOSFETS, P channel MOSFETs or any type of synchronous rectifier switch which has a parasitic diode. The switches may also be, but are not limited to, low drain-source on-state resistance switches.

Figure 4:
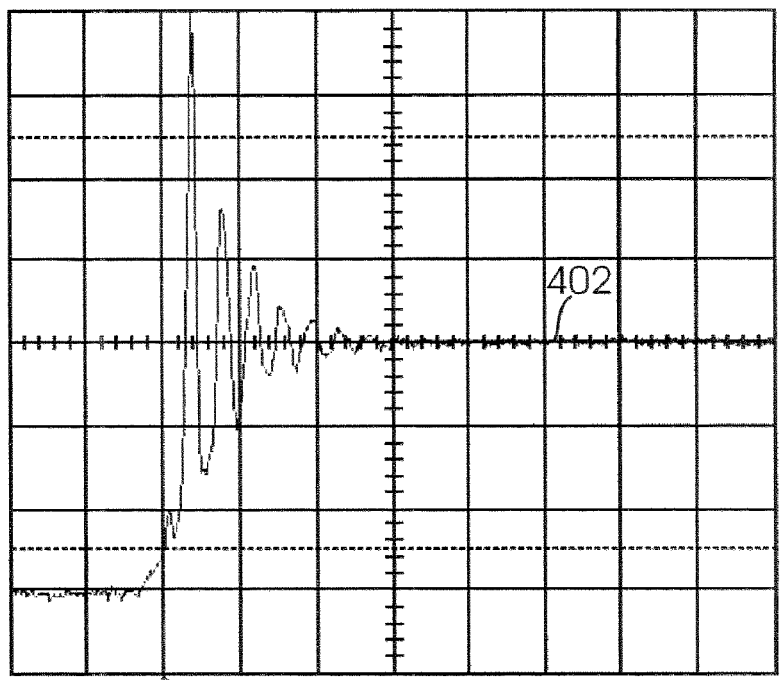
FIG. 4 is a waveform captured by an oscilloscope showing voltage waveforms appearing at a node of the circuit shown in FIG. 1.
Figure 5:
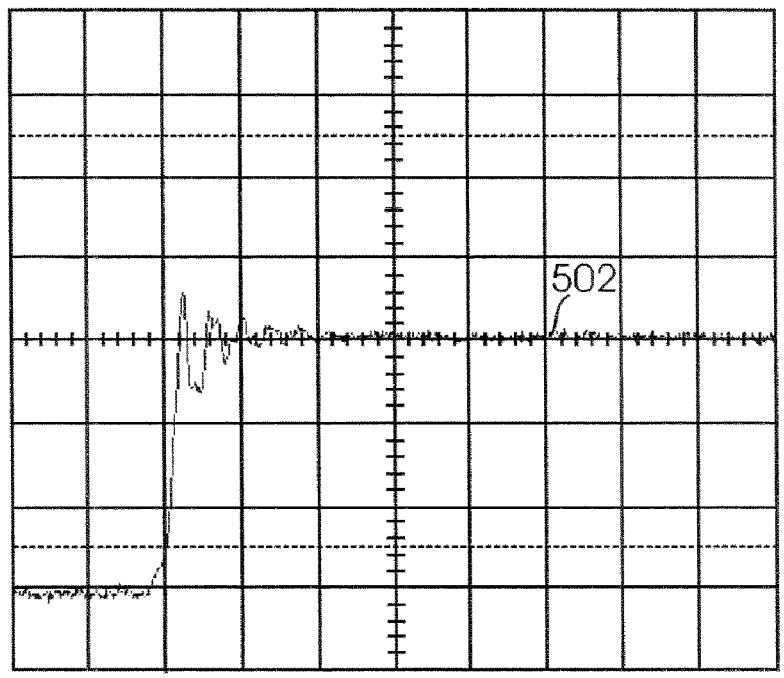
FIG. 5 is a waveform captured by an oscilloscope showing voltage waveforms appearing at a node of the circuit shown in FIG. 2 in accordance with an embodiment of the present invention.

FIG. 4 shows a voltage waveform 402 at node 116 of circuit 100. The waveform depicts excessive ringing which is a source of adverse EMI effects. In contrast, FIG. 5 shows a voltage waveform 502 at node 136 of circuit 120, which demonstrates that by eliminating the body diode reverse recovery effect, EMI conditions are greatly improved.

Figure 6:
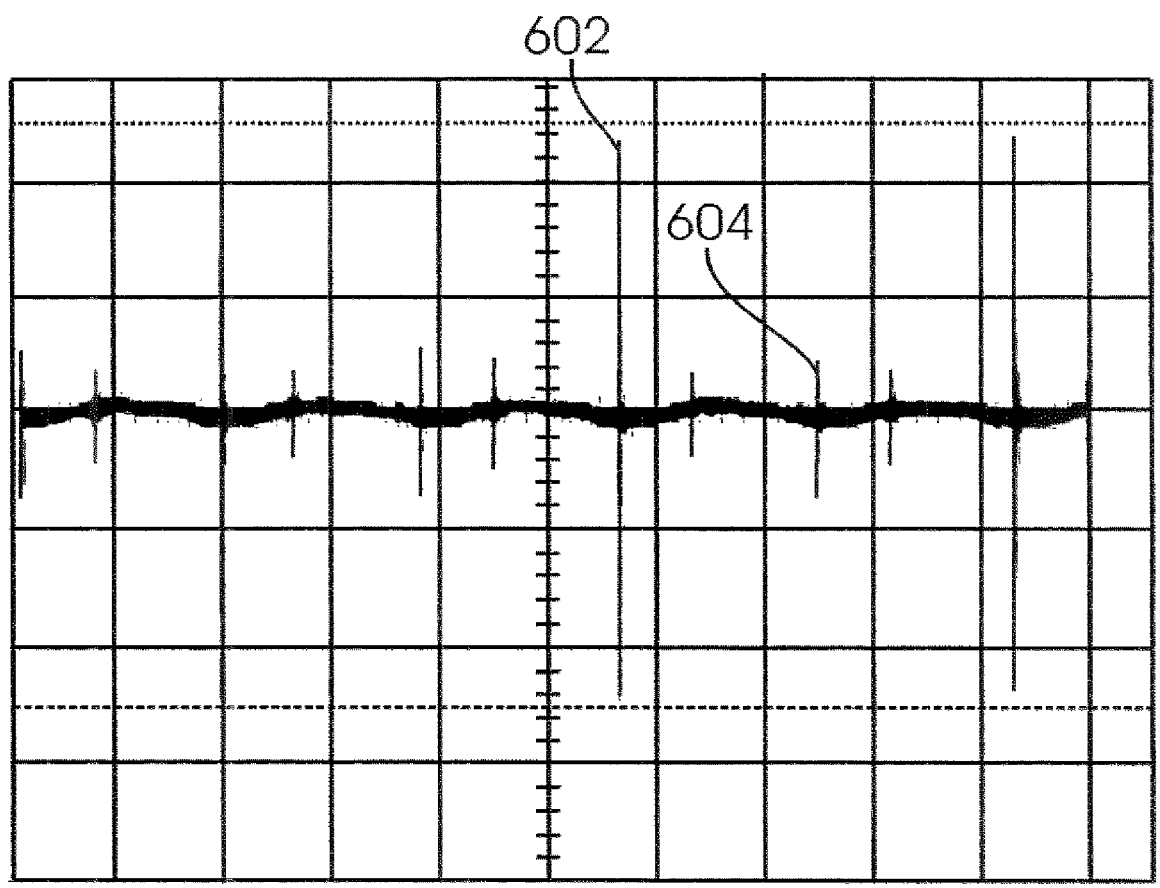
FIG. 6 is a waveform captured by an oscilloscope showing combined voltage ripple and voltage spike ringing at the output of a two-phase power electronics switching circuit, with one phase configured as shown in FIG. 1 and the second phase configured as shown in FIG. 2 in accordance with an embodiment of the present invention.

FIG. 6 shows side-by-side voltage ripple and voltage spike ringing at the outputs 118 of circuit 100 of FIG. 1 (plot 602) and 138 of circuit 120 of FIG. 2 (plot 604), while nodes 118 and 138 are connected together. The comparison demonstrates the performance advantage of the present invention over typical circuits.

Although the present invention has been described with reference to specific embodiments, these embodiments are illustrative only and are not limiting. Many other applications and embodiments of the present invention will be apparent in light of this disclosure and the following claims.

What is claimed is:

1. A circuit comprising:
   a first switch which prevents the flow of current during a time when a voltage is applied across it, but that can be turned on to allow current to flow;
   a second switch coupled serially to the first switch for preventing current flow through a body diode of the first switch, the second switch is coupled having its source lead connected to a source lead of he first switch;
   a free-wheeling diode coupled in parallel across the first and second switches for providing an alternate conduction path for current flow during a time when the second switch is off;
   a switch controller coupled to the first switch and the second switch for controlling the on/off time of the first and second switches; and
   a delay coupled between the controller and the first switch for providing a sufficient timing margin.

2. The circuit of claim 1, wherein the first switch comprises a synchronous rectifier switch having a parasitic diode.

3. The circuit of claim 1, wherein the first switch comprises a low on-state resistance switch.

4. The circuit of Claim 1, wherein the second switch comprises a lower breakdown voltage than the first switch.

5. The circuit of claim 1. wherein the second switch comprises a low on-state resistance switch.

6. The circuit of claim 1. wherein the delay comprises resistor-capacitor filter coupled to a switch driver input of the switch controller.

7. A circuit comprising:
   a first switching means coupled between a power source and a load;
   a second switching means coupled parallel with the load;
   a third switching means coupled serially to the second switching means for preventing current flow through a body diode of the second switching means;
   a delay means coupled to the second switching means for providing a sufficient timing margin to the circuit; and
   a second diode coupled parallel across the second switching n cans and the third switching means for providing an alternative conduction path for a load current during a time when the first switching means and the third switching means are off.

8. The circuit of claim 7, further comprising a switch controller coupled to the first switching means, the second switching means and the third switching means for controlling on/off time of the first switching means, the second switching means and the third switching means.

9. The circuit of claim 7, wherein the first second and third switching means comprise N channel MOSFETs.

10. The circuit of claim 7, wherein the first second and third switching means comprise P channel MOSFETs.

11. The circuit of claim 7, wherein the seconds switching means comprises a synchronous rectifier switch having a parasitic diode.

* * * * *